US009025846B2

(12) United States Patent
Liang et al.

(10) Patent No.: US 9,025,846 B2
(45) Date of Patent: May 5, 2015

(54) SPARSE DATA RECONSTRUCTION FOR GATED X-RAY CT IMAGING (75) Inventors: Hongjie Liang, San Jose, CA (US); Jinghan Ye, Cupertino, CA (US); Jiong Wang, Santa Clara, CA (US); Lingxiong Shao, Saratoga, CA (US)

(73) Assignee: Koninklijke Philips N.V., Eindhoven (NL)

( * ) Notice: Subject to any disclaimer, the term of this patent is extended or adjusted under 35 U.S.C. 154(b) by 225 days.

(21) Appl. No.: 13/576,823

(22) PCT Filed: Jan. 12, 2011

(86) PCT No.: PCT/IB2011/050136
§ 371 (c)(1), (2), (4) Date: Aug. 2, 2012

(87) PCT Pub. No.: WO2011/101752
PCT Pub. Date: Aug. 25, 2011

(65) Prior Publication Data
US 2013/0070994 A1 Mar. 21, 2013

Related U.S. Application Data (60) Provisional application No. 61/306,567, filed on Feb. 22, 2010.

(51) Int. Cl.
G06K 9/00 (2006.01)
G06T 7/00 (2006.01)
G06T 11/00 (2006.01)
(52) U.S. Cl.
CPC ............. *G06T 7/0012* (2013.01); *G06T 11/006* (2013.01); *G06T 2211/412* (2013.01)

(58) Field of Classification Search
USPC .................................... 382/124–134
See application file for complete search history.

(56) References Cited

U.S. PATENT DOCUMENTS

| 4,547,892 | A | 10/1985 | Richey et al. | |
|---|---|---|---|---|
| 6,558,325 | B1 * | 5/2003 | Pang et al. | 600/443 |
| 7,006,862 | B2 | 2/2006 | Kaufman et al. | |
| 7,289,841 | B2 | 10/2007 | Johnson et al. | |
| 7,415,093 | B2 | 8/2008 | Tkaczyk et al. | |
| 7,756,304 | B2 * | 7/2010 | Hossack et al. | 382/128 |

(Continued)

OTHER PUBLICATIONS

Earls, J, P., et al.; Prospectively Gated Transverse Coronary CT Angiography versus Retrospectively Gated Helical Technique: Improved Image Quality and Reduced Radiation Dose; 2008; Radiology; 246(3)742-753.

(Continued)

*Primary Examiner* — Alex Liew (57) ABSTRACT

When imaging a compact structure, such as a calcium deposit in a patient's heart, a slow scan (e.g., less than approximately 6 rpm) CT data acquisition is performed, wherein data is continuously but sparsely acquired during around a 360° revolution around the patient. Arc segments are defined that equate to one heart cycle (e.g., heartbeat) given the patient's heart rate and the speed of the CT gantry. Electrocardiogram signal data is used to identify sets of acquired projection data that correspond to each of a plurality of heart cycle phases during which the heart is relatively still. A sparse reconstruction algorithm is executed on the identified sets of sparse projection data to generate images for each heart cycle phase from the scan data acquired for that phase across all heart cycles.

18 Claims, 12 Drawing Sheets

(56) References Cited

U.S. PATENT DOCUMENTS

| | | | |
|---|---|---|---|
| 7,907,698 B2* | 3/2011 | Shao et al. | 378/8 |
| 8,411,915 B2* | 4/2013 | Wischmann et al. | 382/128 |
| 2001/0012385 A1* | 8/2001 | Hossack et al. | 382/128 |
| 2003/0002616 A1* | 1/2003 | Cesmeli | 378/8 |
| 2003/0233039 A1* | 12/2003 | Shao et al. | 600/407 |
| 2004/0116804 A1* | 6/2004 | Mostafavi | 600/428 |
| 2007/0238997 A1* | 10/2007 | Camus | 600/437 |
| 2008/0221442 A1* | 9/2008 | Tolkowsky et al. | 600/425 |
| 2008/0226149 A1* | 9/2008 | Wischmann et al. | 382/131 |
| 2009/0161932 A1 | 6/2009 | Chen | |
| 2009/0161933 A1 | 6/2009 | Chen | |
| 2009/0225933 A1* | 9/2009 | Shao et al. | 378/15 |
| 2010/0284598 A1* | 11/2010 | Zhao et al. | 382/131 |
| 2013/0070994 A1* | 3/2013 | Liang et al. | 382/131 |

OTHER PUBLICATIONS

Sidky, E. Y., et al.; Accurate image reconstruction from few-views and limited-angle data in divergent-beam CT; 2006; Journal of X-ray Science and Technology; 14:119-139.

* cited by examiner

Phase 4

Truth          SR

SPARSE DATA RECONSTRUCTION FOR GATED X-RAY CT IMAGING

CROSS REFERENCE TO RELATED APPLICATIONS

This application claims the benefit of U.S. Provisional Application Ser. No. 61/306,567 filed Feb. 22, 2010, which is incorporated herein by reference.

DESCRIPTION

The present application finds particular utility in gated cardiac CT data reconstruction procedures and systems. However, it will be appreciated that the described technique(s) may also find application in other types of imaging systems, other image reconstruction techniques, and/or other medical applications.

Electron beam CT (EBCT) was specially designed for imaging hearts. It utilizes fast-sweeping electron beams to bombard a large tungsten target sitting around the patient, generating X-ray beams for imaging. Since there are no physical moving parts in the X-ray gantry, it can achieve extremely fast scanning speed, generally significantly less than 100 ms per slice, which is good enough to "freeze" the heart with the use of ECG gating. Therefore EBCT has been the gold standard device to perform cardiac calcium scoring tests for many years. However, EBCT has several drawbacks. First of all, the images suffer from high statistical noise as the output power of the system is limited by the design; second, it is highly specialized for cardiac applications and cannot be used as a generally-purpose CT; third, the hardware is expensive. Therefore, in recent years, multi-slice CT (MSCT) has started to emerge and become an alternative to EBCT in cardiac imaging.

Other techniques for imaging a beating heart for diagnosis include using a high-speed (with sub-second rotation) MSCT with the aid of prospective or retrospective ECG gating. In the case of prospective gating, the CT gantry continues rotating around the patient. The X-ray tube is kept off most of the time and is triggered only when the ECG signal indicates that the heart falls in certain motion phases. Once the heart is ready for taking a snapshot, the X-ray tube will emit X-rays and the gantry must quickly cover enough angles for a valid reconstruction before the heart leaves this motion phase and the electronics also need to be fast enough to acquire, transfer and store the data. The patient bed then moves to the next bed position and the above procedures is repeated until the whole heart is covered. If retrospective ECG gating is used, the X-ray tube emits continuously, acquiring at least one heart cycle at each bed position. The "good" data is selected out afterwards based on the ECG signal makers and used for reconstruction.

Conventional methods thus attempt to freeze object motion by using a fast CT and prospective or retrospective cardiac gating which adversely result in high radiation dose and/or permit only one single phase of the heart to be reconstructed. Since the projection data required for each reconstructed slice needs to be acquired within a very short duration, conventional methods also impose demanding requirements on system mechanical and electrical design. The conventional methods have several drawbacks: the system gantry is required to move very fast, which prevents a relatively slow-rotating flat panel CT system from employing said conventional methods; radiation dose can be very high, especially when using retrospective gating; and in practice, the entire heart motion cannot be recovered.

There is an unmet need in the art for systems and methods that facilitate generating motionless images of particular heart cycle phases using a cost-effective, safe, slow-scan CT scanner with a flat-panel X-ray CT detector, and the like, thereby overcoming the deficiencies noted above.

In accordance with one aspect, a system that facilitates using sparse data reconstruction for gated computed tomography imaging includes a CT scanner that includes a rotating gantry with an X-ray source and a flat panel X-ray detector, and that performs a slow CT scan of a heart in a patient in order to generate a plurality of sets of projection image data while rotating the gantry continuously around the patient, and a patient monitoring device that generates physiological cycle phase information. The system further includes a processor that sorts the projection image data by a plurality of physiological cycle phases such that the data for each physiological cycle phase spans a plurality of short arc segments separated by long arc segments, the long arc segments being longer than the short arc segments. The processor executes a sparse data reconstruction algorithm and reconstructs an image of each of the physiological cycle phases, each image being reconstructed over the plurality of short arc segments corresponding to the physiological cycle phase during a plurality of physiological cycles.

According to another aspect, a method of using sparse data reconstruction for gated X-ray computed tomography imaging includes acquiring CT scan data of a beating heart by slowly and continuously rotating a gantry of a CT scanner, with an X-ray source and a flat-panel x-ray detector coupled thereto, about a patient to generate a plurality of sets of projection image data. The method further includes acquiring physiological signal data describing a plurality of physiological cycles of the patient's heart while acquiring the CT scan data, and identifying different phases of each physiological cycle using the physiological signal data. Additionally, the method includes sorting the projection image data according to a phase during which the image projection data was acquired, and executing a sparse reconstruction algorithm on the sorted projection image data to reconstruct images of each identified phase of the physiological cycles.

According to another aspect, a system that facilitates reconstructing an anatomical image from sparse projection data acquired during a gated, slow computed tomography (CT) scan includes a CT scanner that performs a slow, gated CT scan of a volume of interest that is in motion during the scan, and collects sparse projection data over a plurality of short arc segments corresponding to phases of multiple physiological cycles during a 360° revolution around the volume of interest. The system further includes a processor that generates an image of the volume of interest by executing a sparse data reconstruction algorithm that reconstructs the sparse projection data acquired along the plurality of short arc segments during the revolution of the CT scanner.

One advantage is reduced cost compared to cardiac CT imaging using fast MSCTs.

Another advantage resides in improved attenuation correction for PET/SPECT image data using a cardiac phase-specific attenuation map.

Another advantage is that the entire heart motion cycle can be captured with no more X-ray dose than a regular CT scan.

Another advantage is that a single phrase, motion-free heart image is obtained with a fraction of a regular CT radiation dose.

Still further advantages of the subject innovation will be appreciated by those of ordinary skill in the art upon reading and understanding the following detailed description.

The drawings are only for purposes of illustrating various aspects and are not to be construed as limiting.

Figure 1:
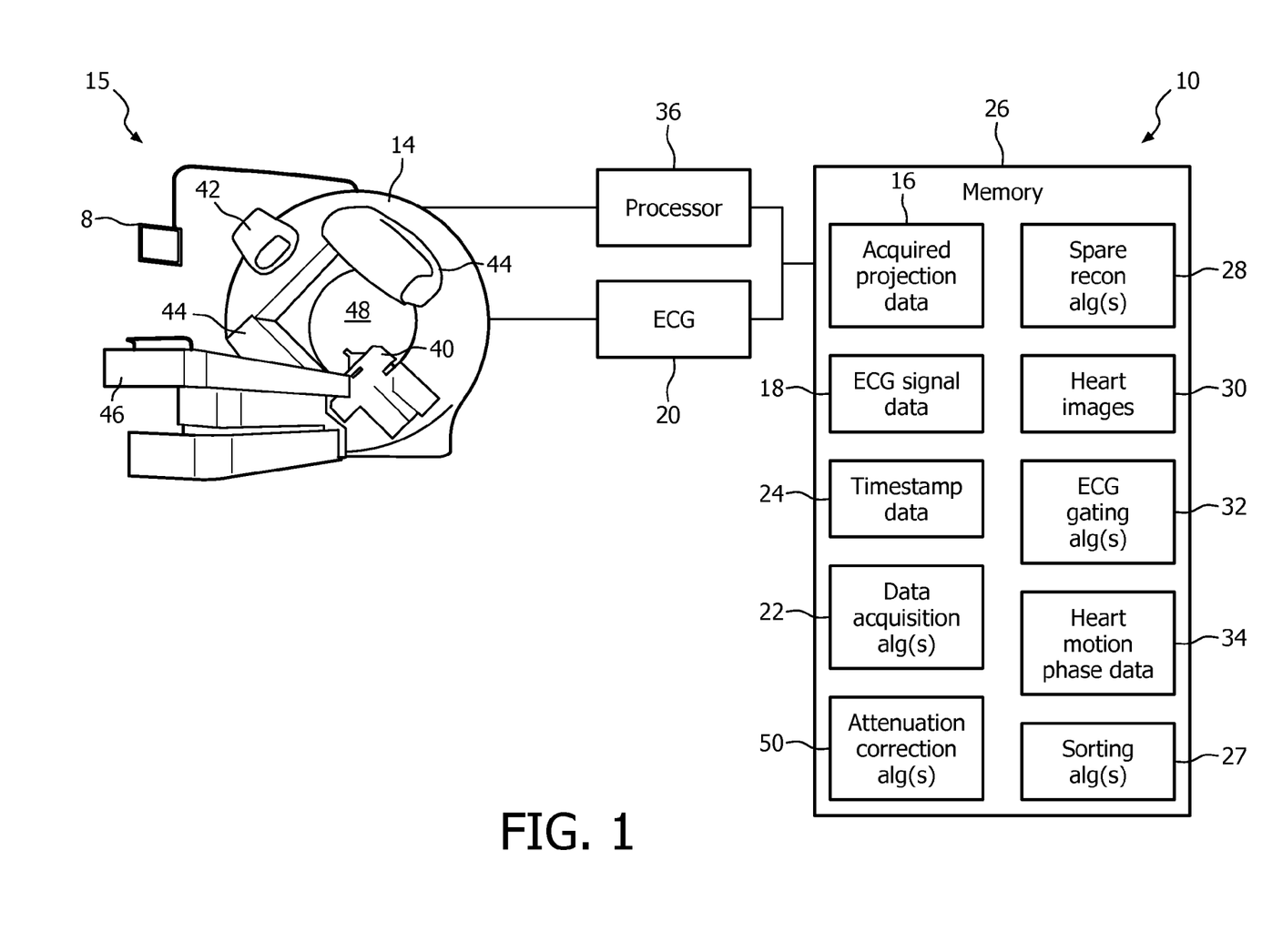
FIG. 1 illustrates a system that employs a sparse data reconstruction technique to image a periodically moving object (e.g. a heart) for gated cardiac imaging and the like, in order to detect calcium deposits in coronary arteries.

With reference to FIG. 1, a system 10 is illustrated that employs a sparse data reconstruction technique to image a periodically moving object (e.g. a heart). The present embodiment focuses on gated cardiac imaging (e.g., such as for calcium scoring in order to detect calcium deposits in myocardial tissue, CT angiography, etc.). However, stop-motion imaging for other purposes is also contemplated. For instance, a slow X-ray CT scan algorithm or technique 12 for cardiac imaging is employed so that each revolution of a gantry 14 on a CT scanner 15 (such as Philips' BRIGHTVIEW™ XCT scanner, or the like) contains several heart motion cycles, e.g., 10-12. A "slow" scan is defined as a scan having a sampling period (or arc distance) that is large enough that a volume of interest may be assumed to exhibit motion, as opposed to a "fast" scan, in which a volume of interest is assumed to be motionless. For instance, if the volume of interest is a human heart, which beats approximately once a second, then a slow scan may employ a sampling period of approximately 700 ms or more, such that the heart will exhibit movement at some point during the sampling period. In contrast, a fast scan of the same heart may have a sampling period of 10 ms or less, such that it becomes very likely that projection data gathered during the fast scan sampling period will generate a "still" image when reconstructed. That is, the sampling period of the fast scan is sufficiently small that heart movement is not a factor. By using a slow scan and sparsely acquiring projection data associated with phases of interest in a physiological cycle such as a heartbeat, radiation dose to the patient is limited. Additionally, sparse data acquisition during a slow CT scan permits the use of sparse data reconstruction algorithms for reconstructing the sparse projection data into an image.

Acquired projection data 16 for each motion phase is selected according to electrocardiogram (ECG) signal data 18 recorded by a patient monitoring device such as an ECG device 20 and timestamped during data acquisition 22. In another embodiment, a respiratory monitor is used to generate respiratory cycle signal data for use in a gated respiratory imaging procedure. Timestamp information 24 and ECG data 18 are stored in a memory 26. The data is sorted by a sorting algorithm 27 that, when executed by the processor, sorts the data according to cardiac phase, and each phase of the heart is then reconstructed using a sparse data reconstruction algorithm 28, to create a series of high-resolution, motion-free heart images 30 (e.g., 3D or slice images of the heart). Sparse data reconstruction is an iterative reconstruction algorithm using limited projection views. It can produce high quality CT images from as few as 20 angular views. As a comparison, typical CT reconstruction algorithms require more than 10 times as many angular views. An example of a sparse data reconstruction technique is described in "Accurate image reconstruction from few-views and limited-angle data in divergent-beam CT", Emil Y. Sidky, Chien-Min Kao and Xiaochuan Pan, Journal of X-Ray Science and Technology 14 (2006) 119-139. The reconstruction algorithm 28 and heart images 30 are also stored in the memory 26. The system 10 thus facilitates recovering the complete heart motion cycle using a single slow CT scan revolution, and can be employed in conjunction with both helical and flat panel CT imaging devices while reducing radiation dose to patients.

Accordingly, the system executes a slow CT scan of the beating heart using ECG gating 32 (e.g., a gating algorithm stored in the memory 26). The duration of the single scan revolution is long enough to encompass several heart cycles, but short enough to permit breath-holding during the scan. For instance, a patient's heart may beat 60 times per minute, resulting in a heart cycle duration of one second. The patient's respiratory rate may be 12 breaths per minute, or once every 5 seconds, although the patient may be able to hold his or her breath for a longer duration. In this case, slow scan revolution duration may be approximately 12 seconds, to encompass 12 heartbeats while remaining reasonably short in order to permit the patient to hold his breath without becoming uncomfortable. Although described in terms of a 360° rotation, it is to be appreciated that the scanner may rotate more or less than 360° during the breath-hold.

Based on the ECG signals 18, the projection images 30 generated from the heart image data 30 are grouped into different heart motion phases 34, which are shown in detail in FIGS. 3-10. Each phase contains a few projections of that phase of each heart beat for each of the 12 or other number of heartbeats per breath-hold. The sparse reconstruction algorithm 28 is executed on the projection data from each phase, e.g., by a processor 36, to reconstruct each motion phase into cine image data 30 comprising a series of images spanning a complete heart motion cycle, which is displayed on a display 38. The slow-spin CT system 10 with gated cardiac imaging can be used in conjunction with multiple CT systems, including but not limited to flat-panel CTs, helical CTs, cone-beam CT systems such as Philips' BRIGHTVIEW™-XCT system or the like, etc.

The system 10 includes the processor 36 that executes, and the memory 26 that stores, computer executable instructions for carrying out the functions, methods, techniques, etc., described herein. For instance, the processor 36 executes computer-readable instructions for acquiring projection data, for selecting acquired projection data, for time-stamping ECG signal data, for performing sparse data reconstruction, for displaying motion-free heart image data, and any other functions described herein.

The memory 26 may be a computer-readable medium on which a control program is stored, such as a disk, hard drive, or the like. Common forms of computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor 36 can read and execute. In this context, the system 10 may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

According to one embodiment, the system 10 collects cardiac imaging data using a slowly rotating a flat panel x-ray detector 40 positioned opposite an x-ray source 42, both of which are coupled to the rotating gantry 14 of the CT scanner 15. The illustrated scanner further includes a pair of nuclear detectors 44 (e.g., single photon emission computed tomography (SPECT) detectors or some other suitable nuclear detectors), the display 38, and a patient table or couch 46 that translates a patient (not shown) into an examination region 48 for imaging.

It will be appreciated that the described systems and methods employ dual imaging modalities, wherein combined SPECT/CT imaging modalities are described by way of example, although other combinations are contemplated. For instance, the described systems and methods may employ combined positron emission tomography (PET)/computed tomography (CT), SPECT/magnetic resonance imaging (MRI), PET/MRI, SPECT/ultrasound, PET/ultrasound, or any other suitable multi-modal imaging technique. The multi-modality of the herein-described systems provides several advantages, such as facilitating generation of functional images while permitting the use of targeted molecular agents (e.g., tracers, markers, etc.) and the like. Additionally, although many examples described herein relate to calcium deposit detection, it will be appreciated that the described systems and methods may be employed to any suitable dense or compact material or structure, as well as for other medical procedures.

According to another embodiment, an attenuation correction algorithm 50 (e.g., a module or computer-executable instructions) is stored in the memory for execution by the processor to correct for attenuation in a nuclear image generated from nuclear scan data acquired by the nuclear detectors 44. The attenuation correction module 50 employs the heart images 30 and optionally the heart motion phase data 34 to improve the quality of the nuclear images. The attenuation correction module may include instructions for performing attenuation correction of nuclear image data using CT image data that are known in the art, or variants thereof.

The flat-panel x-ray detector design of the CT scanner 15 provides good spatial resolution, while the small footprint of the system allows it to be used in interventional applications that cannot accommodate larger, traditional multi-modal imaging systems. Additionally, the multi-modal CT system employs a common imaging plane for multiple imaging modes, which facilitates fusing image data from the multiple modes. The geometry of the nuclear detector heads 44 permits an operator to move (e.g., retract to a stowed position) one or more heads out of the way during CT imaging or when an interventionist needs to access the patient, and/or to fold the flat-panel X-ray detector 40 into a stowed position during nuclear imaging. One or more of the nuclear cameras and the X-ray detector may also be moved to a stowed position to permit a clinician or interventionist to access the patient, such as during a procedure or the like. Moreover, the relatively slow rotation (e.g., approximately 5-6 rpm or less) of the imaging components (e.g., detectors, cameras, sources, etc.) improves safety for the patient and the operator.

According to another embodiment, the flat panel detector 40 and the X-ray source 42 are rotated continuously while collecting a set of data over a plurality of heartbeats, e.g., 10-12 heartbeats. Because the heart is in the selected cardiac phase for only a fraction of the heartbeat, data is collected along a plurality of closely spaced angles over a plurality (e.g., 10-12) of intermittent arc segments. The number of samples for each phase is not necessarily the same, but varies in accordance with the duration of time that the heart remains in a substantially common position. For example, data samplings are normally made during fast moving portions of the cardiac cycle, such as during the Q-R-S portion of the cycle. This aspect is described in greater detail with regard to FIG. 2.

Figure 2:
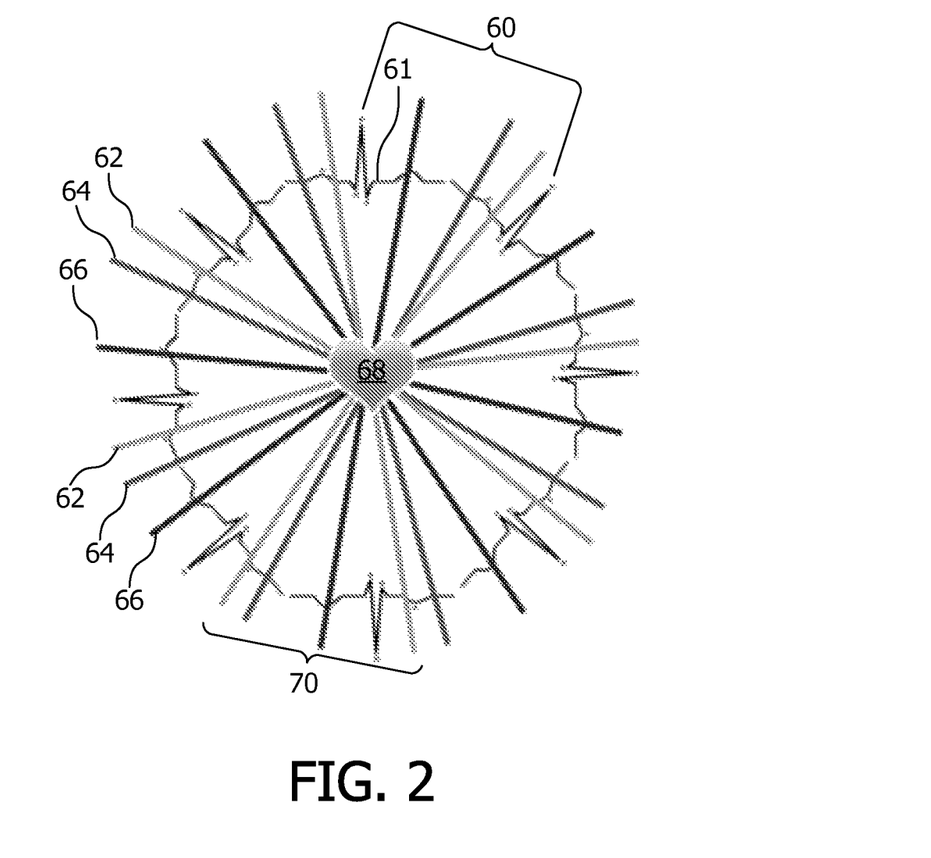
FIG. 2 illustrates a schematic view of a plurality of heart cycle phases, indicated by differently-dashed lines.

With continued reference to FIG. 1, FIG. 2 illustrates a schematic view of a plurality of heart cycle phases, indicated by differently-dashed lines. In the illustrated example, 8 arc segments 60, each spanning one heart cycle 61 are depicted, each of which includes a plurality of phases of which three phases 62, 64, 66 of a heartbeat of patient's heart 68 are labeled. It will be appreciated however that data describing any desired number of heart cycles and any desired number of heart phases may be acquired.

Intervening arc segments or gaps 70 between samplings of the data in each phase may be as large, or larger, than the arc segments corresponding to each of the phases 62, 64, 66 over which data is collected. For example, the data for each phase 62 is collected over 8 arc segments, in the example of FIG. 2, wherein the heart is in phase 62. The arc segment corresponds to the duration that the heart is in a relatively still position, e.g., over a few degrees following each marker 62 in which the heart is nearly stationary. The data for each phase is then reconstructed using the sparse data reconstruction algorithm 28. In one embodiment, the sparse data reconstruction algorithm uses regularization based on assumptions about the resultant image data structure. Due to this regularization, the resultant image has a resolution which is higher, and has fewer artifacts, than if reconstruction were performed on the discontinuous data using a conventional image reconstruction technique. That is, conventional reconstruction techniques cannot reconstruct such discontinuous data.

According to one embodiment 8 cardiac cycles 60 each spans approximately 45° in length. For each cardiac phase, the CT scanner 15 acquires scan data while traversing approximately 1-8° of each cardiac cycle 60. The gaps 70 comprise approximately 37-44°. In other embodiments, the arc length spanned by each cardiac cycle is a function of the patient's heart rate, the number of heart cycles for which scan data is desired, and the rotation speed of the CT scanner.

FIGS. 3-10 show screenshot slice images of a phantom, which are generated as "ground truth" (i.e., reference) images 90, as well as a sparsely reconstructed (SR) image 92 of a patient's heart 94, during each of 8 phases of a heart cycle. Each of the reference image 90 and the sparsely reconstructed image 92 of the patient's heart are generated from data collected over a plurality of different projection angles of the same phase of the heart cycle, and correspond to the 8 heart cycles 61 of FIG. 2. Although the description of each of FIGS. 3-10 includes an example of the number of arcs or angles (or groups of arcs or angles) along which data is sparsely collected (using prospective gating) or reconstructed (using retrospective gating), it will be appreciated that all phases may be captured using a any suitable number of arcs or angles or groups of angles, (e.g., 12 arcs, 10 arcs, 8 groups of 3 sampling angles, etc).

Figure 3:
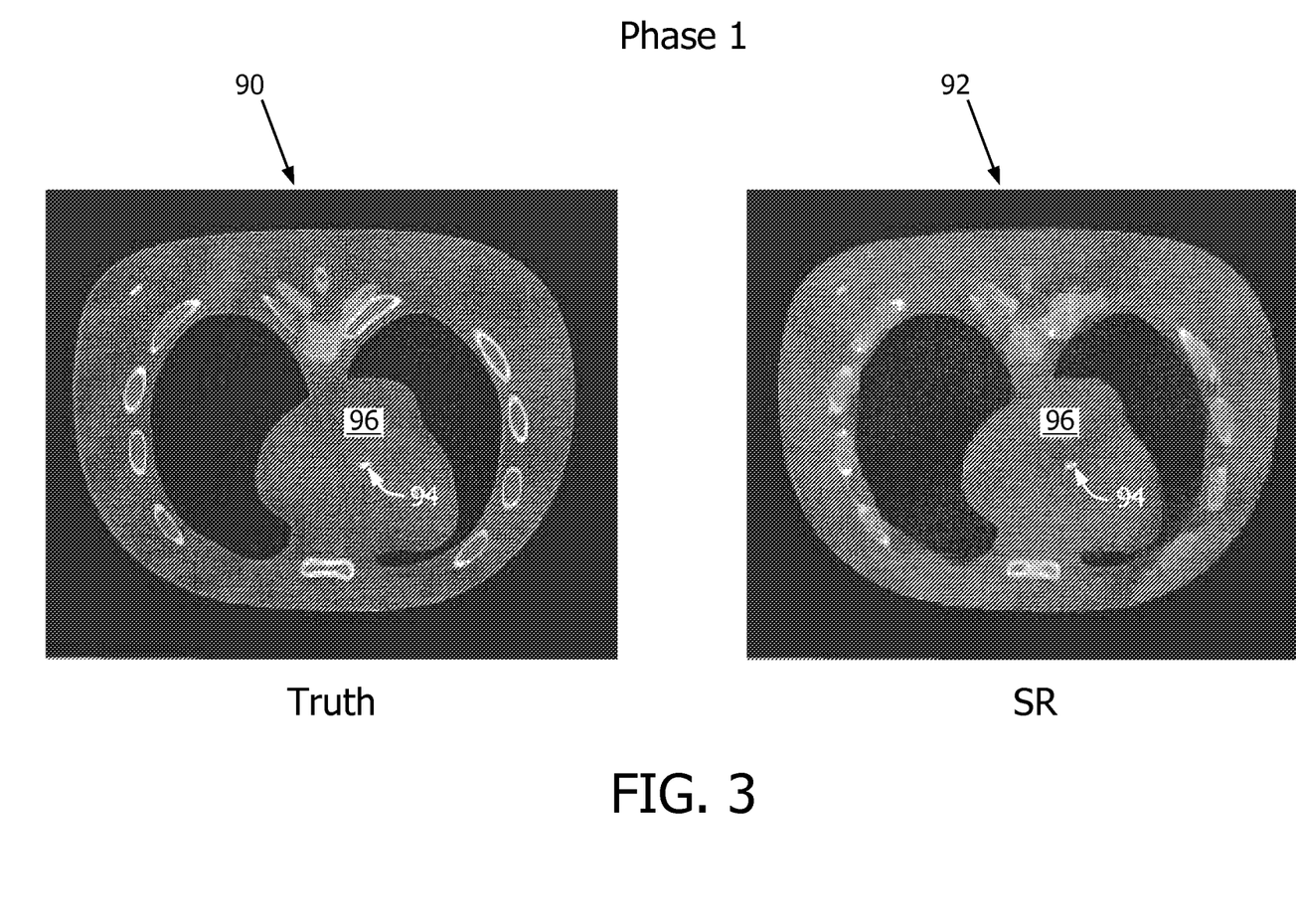
FIG. 3 illustrates a truth slice image and a sparsely reconstructed slice image during a first phase of the heart cycle.

FIG. 3 illustrates the truth image 90 and the sparsely reconstructed image 92 during a first phase of the heart cycle. The SR image 92 is generated from projection data captured along multiple evenly-spaced arcs around the patient. For instance, projection data can be prospectively or retrospectively gated for small angles along 12 arcs during a 360° rotation around the patient, where each arc is separated by approximately 30° (subject to heart rate variation, which is determined by gating the heart cycles). Each arc may comprise 5 sampling angles (e.g., sub-arcs, segments, etc) spaced approximately 0.75° from each other within the arc, so that each of the 12 arcs has an arc length of approximately 3.75°. The 12 sets of projection data are then reconstructed to generate the still image of the phase of the heartbeat being imaged.

Figure 4:
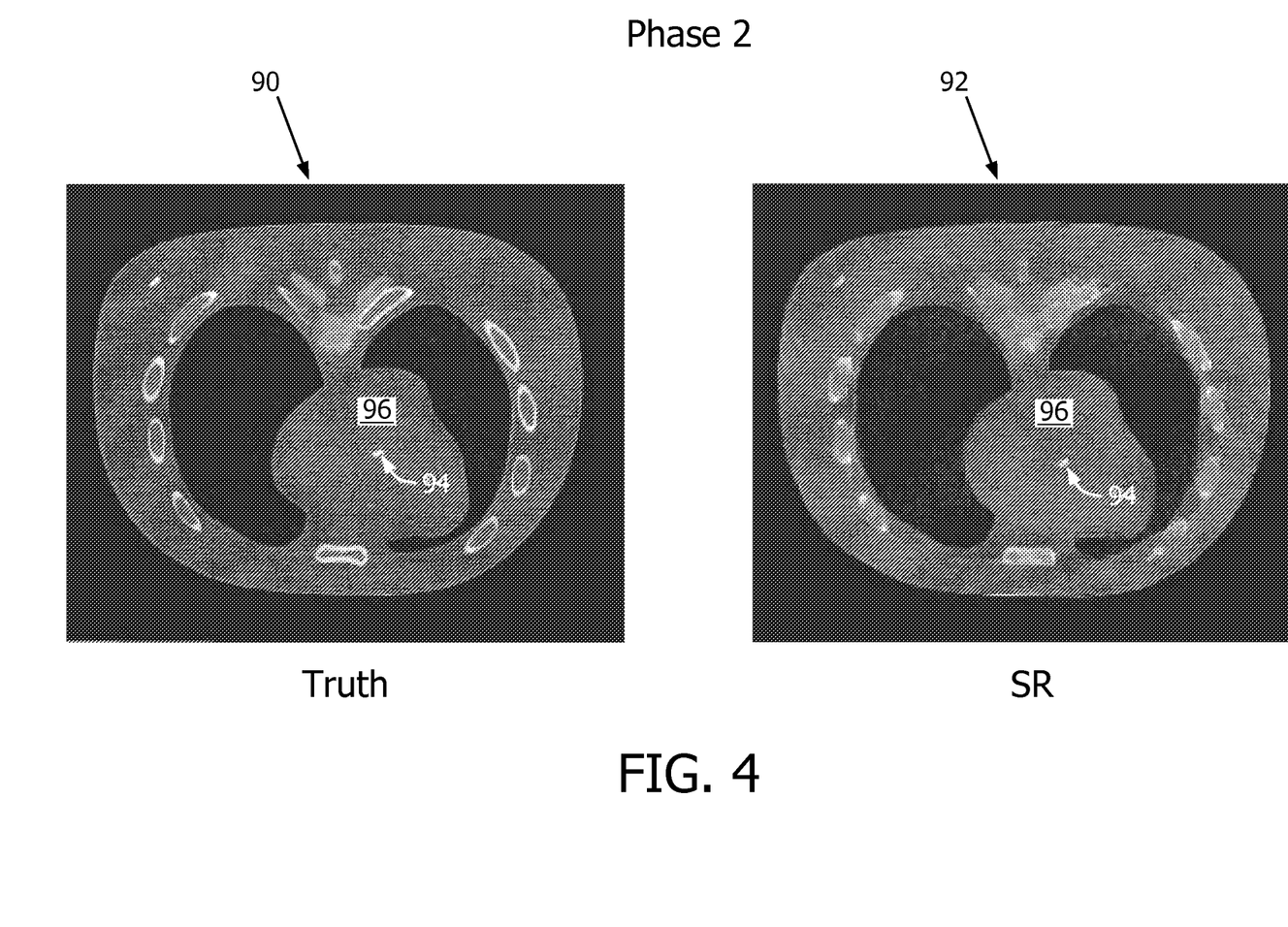
FIG. 4 illustrates the truth image and the sparsely reconstructed image with a calcium deposit shown in the heart during a second phase of the heart cycle.

FIG. 4 illustrates the truth image 90 and the sparsely reconstructed image 92 with a calcium deposit 94 shown in the heart 96 in the truth image only during a second phase of the heart cycle. The SR image 92 of FIG. 4 is reconstructed from a plurality of arcs along a 360° revolution around the patient, each arc corresponding to a phase of a heart cycle and having a length of approximately 3.75°. For example, projection data can be prospectively or retrospectively gated for small angles along 12 arcs during a 360° rotation around the patient, where each arc is separated by approximately 30° (subject to heart rate variation, which is determined by gating the heart cycles). The 12 sets of projection data are then reconstructed to generate the still image of the phase of the heartbeat being imaged along the 12 arcs.

Figure 5:
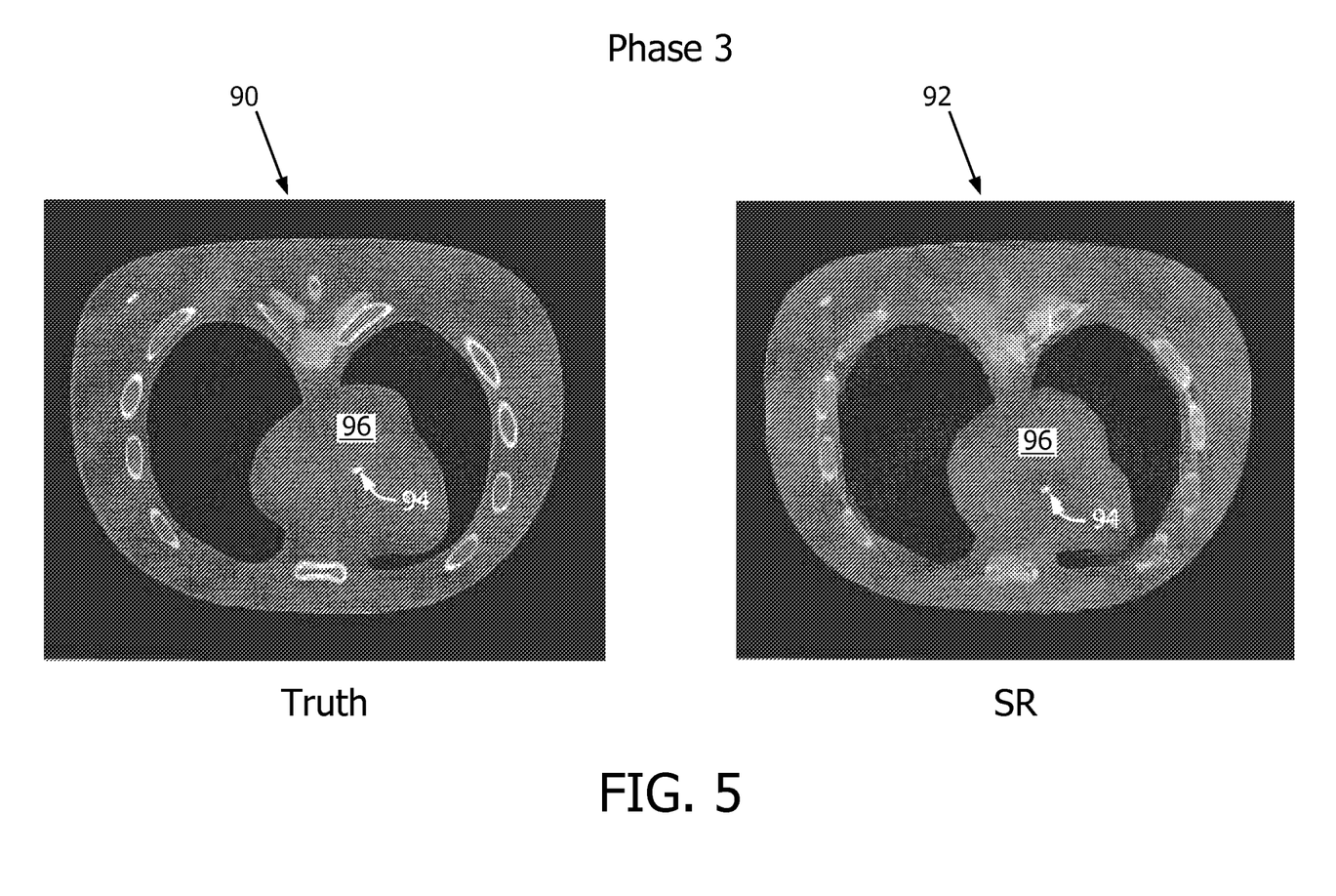
FIG. 5 illustrates the truth image and the sparsely reconstructed image with the calcium deposit shown in the heart during a third phase of the heart cycle.

FIG. 5 illustrates the truth image 90 and the sparsely reconstructed image 92 with the calcium deposit 94 shown in the heart 96 during a third phase of the heart cycle. In one embodiment, the SR image 92 is generated from acquired along 12 segments of a 360° revolution around the patient. For instance, each arc may a few degrees in length, where an arc occurs approximately every 30° (subject to heart rate variation, which is determined by gating the heart cycles).

Figure 6:
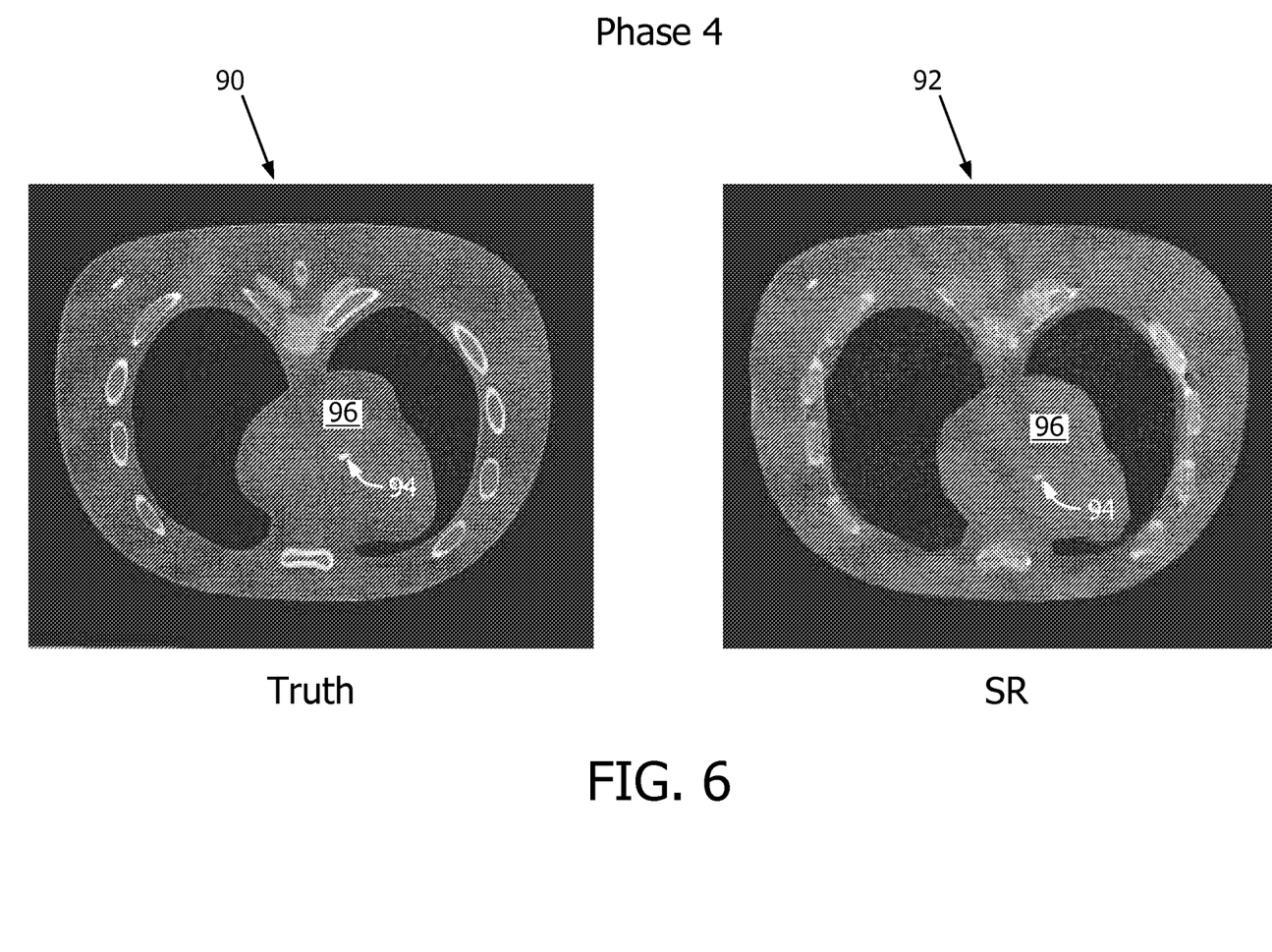
FIG. 6 illustrates the truth image and the sparsely reconstructed image with the calcium deposit shown in the heart during a fourth phase of the heart cycle.

FIG. 6 illustrates the truth image 90 and the sparsely reconstructed image 92 with the calcium deposit 94 shown in the heart 96 during a fourth phase of the heart cycle. The SR image 92 of FIG. 6 is reconstructed from a plurality of groups of arcs along a 360° revolution around the patient. For example, projection data can be prospectively or retrospectively gated for small groups of sampling angles along 12 arcs during a 360° rotation around the patient, where each arc is separated by approximately 30° (subject to heart rate variation, which is determined by gating the heart cycles). Each group of sampling angles may include 5 sampling angles, spaced approximately 0.75° apart. The 12 sets projection data are then reconstructed to generate the still image of the first phase of the heartbeat.

Figure 7:
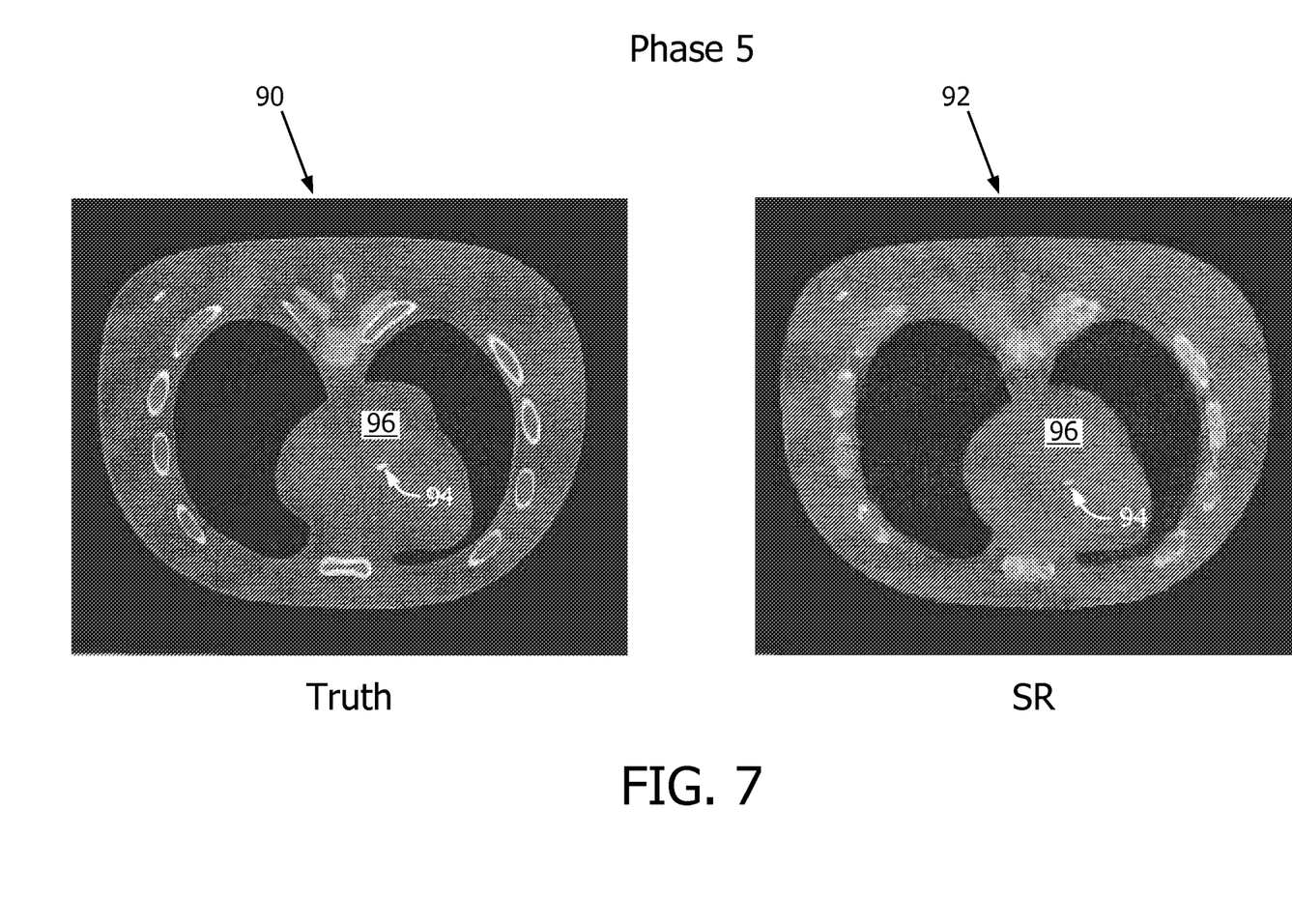
FIG. 7 illustrates the truth image and the sparsely reconstructed image with the calcium deposit shown in the heart during a fifth phase of the heart cycle.

FIG. 7 illustrates the truth image 90 and the sparsely reconstructed image 92 with the calcium deposit 94 shown in the heart 96 during a fifth phase of the heart cycle. In one example, projection data is prospectively or retrospectively gated for small groups of sampling angles along 12 arcs during a 360° rotation around the patient, where each arc is separated by approximately 30° (subject to heart rate variation, which is determined by gating the heart cycles). Each group of sampling angles may include 5 sampling angles, spaced approximately 0.75° apart. The 12 sets projection data are then reconstructed to generate the still image of the first phase of the heartbeat.

Figure 8:
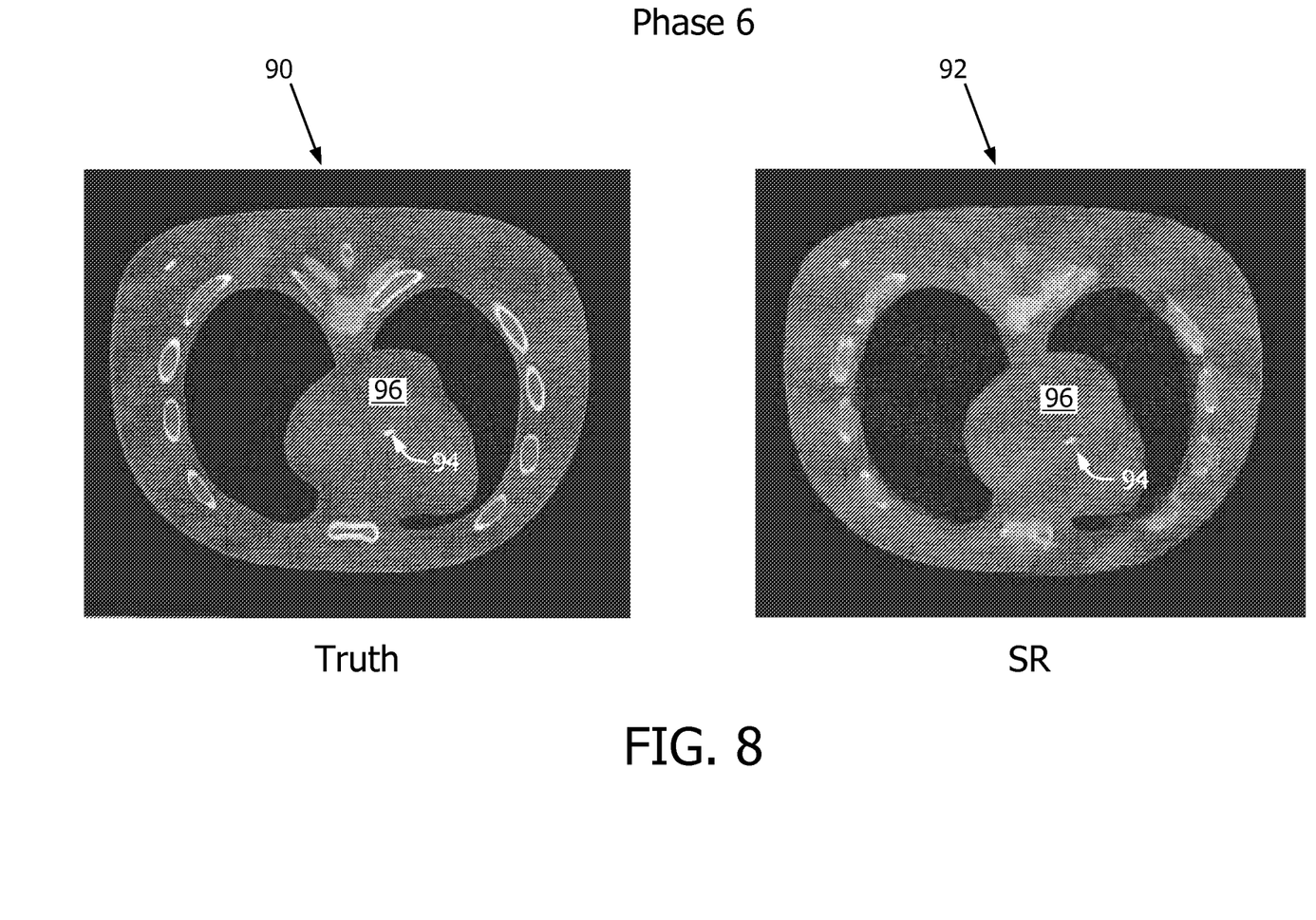
FIG. 8 illustrates the truth image and the sparsely reconstructed image with the calcium deposit shown in the heart during a sixth phase of the heart cycle.

FIG. 8 illustrates the truth image 90 and the sparsely reconstructed image 92 with the calcium deposit 94 shown in the heart 96 during a sixth phase of the heart cycle. According to an example, projection data is prospectively or retrospectively gated for small groups of sampling angles along 12 arcs during a 360° rotation around the patient, where each arc is separated by approximately 30° (subject to heart rate variation, which is determined by gating the heart cycles). Each group of sampling angles may include 5 sampling angles, spaced approximately 0.75° apart. The 12 sets projection data are then reconstructed to generate the still image of the first phase of the heartbeat.

Figure 9:
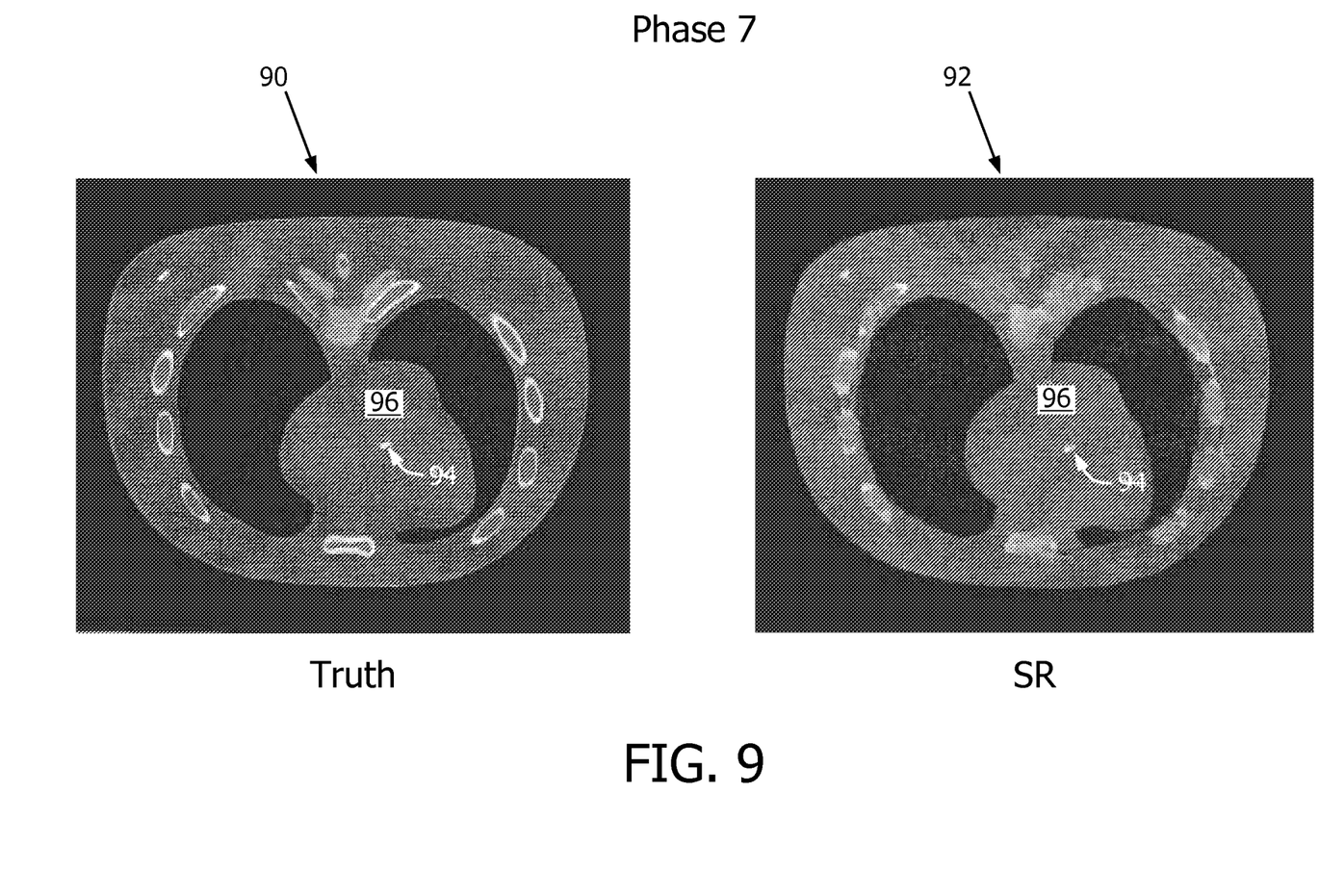
FIG. 9 illustrates the truth image and the sparsely reconstructed image with the calcium deposit shown in the heart during a seventh phase of the heart cycle.

FIG. 9 illustrates the truth image 90 and the sparsely reconstructed image 92 with the calcium deposit 94 shown in the heart 96 during a seventh phase of the heart cycle. The SR image 92 of FIG. 9 is reconstructed from a plurality of arcs along a 360° revolution around the patient. For example, projection data can be prospectively or retrospectively gated for small angles along 12 arcs during a 360° rotation around the patient, where each arc is separated by approximately 30° (subject to heart rate variation, which is determined by gating the heart cycles). The 12 sets of projection data are then reconstructed to generate the still image of the phase of the heartbeat being imaged.

Figure 10:
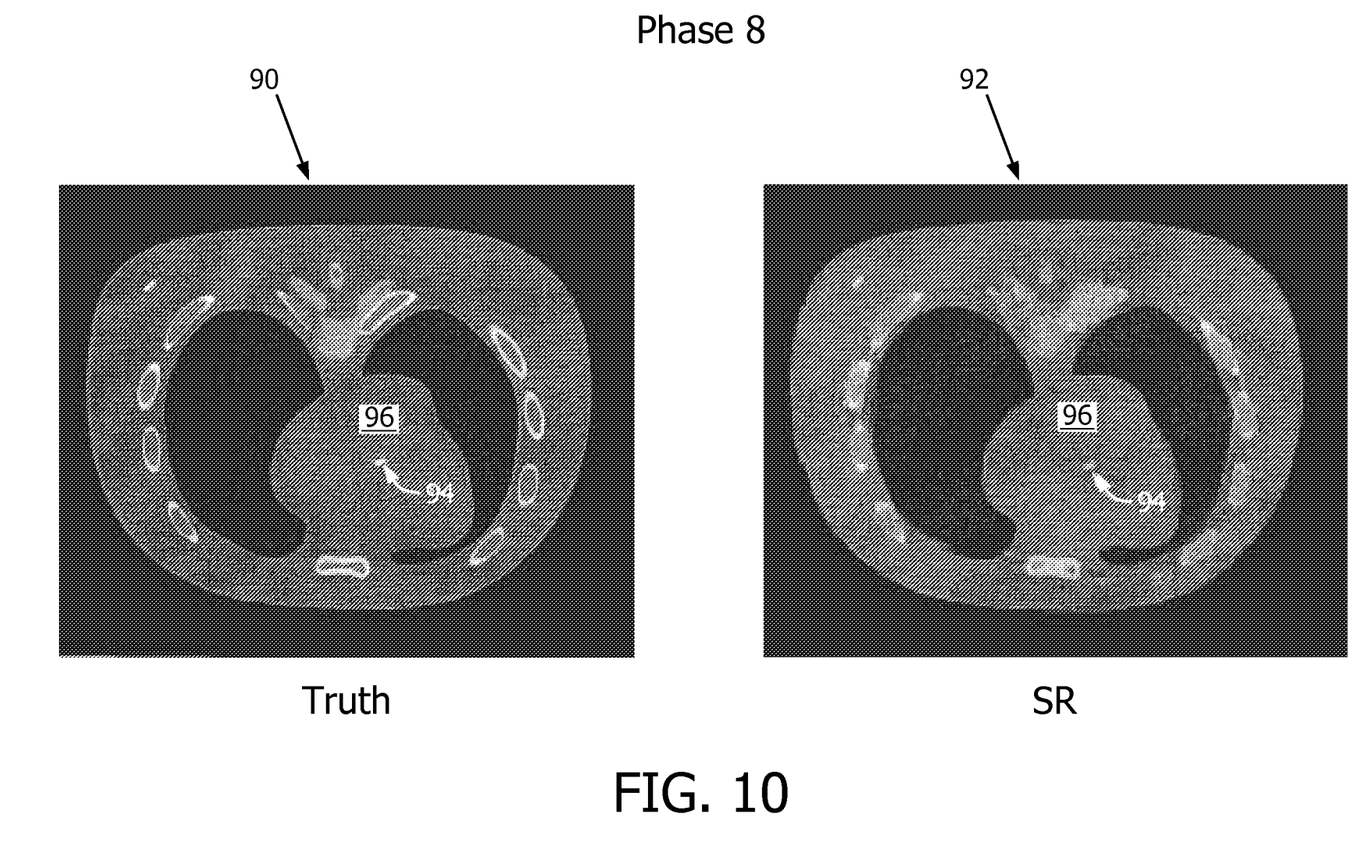
FIG. 10 illustrates the truth image and the sparsely reconstructed image with the calcium deposit shown in the heart during an eighth phase of the heart cycle.

FIG. 10 illustrates the truth image 90 and the sparsely reconstructed image 92 with the calcium deposit 94 shown in the heart 96 during an eighth phase of the heart cycle. In one example, projection data is prospectively or retrospectively gated for small groups of sampling angles along 12 arcs during a 360° rotation around the patient, where each arc is separated by approximately 30° (subject to heart rate variation, which is determined by gating the heart cycles). Each group of sampling angles may include 5 sampling angles, spaced approximately 0.75° apart. The 12 sets projection data, each including projection data from 5 sampling angles, are then reconstructed to generate the still image of the first phase of the heartbeat.

Figure 11:
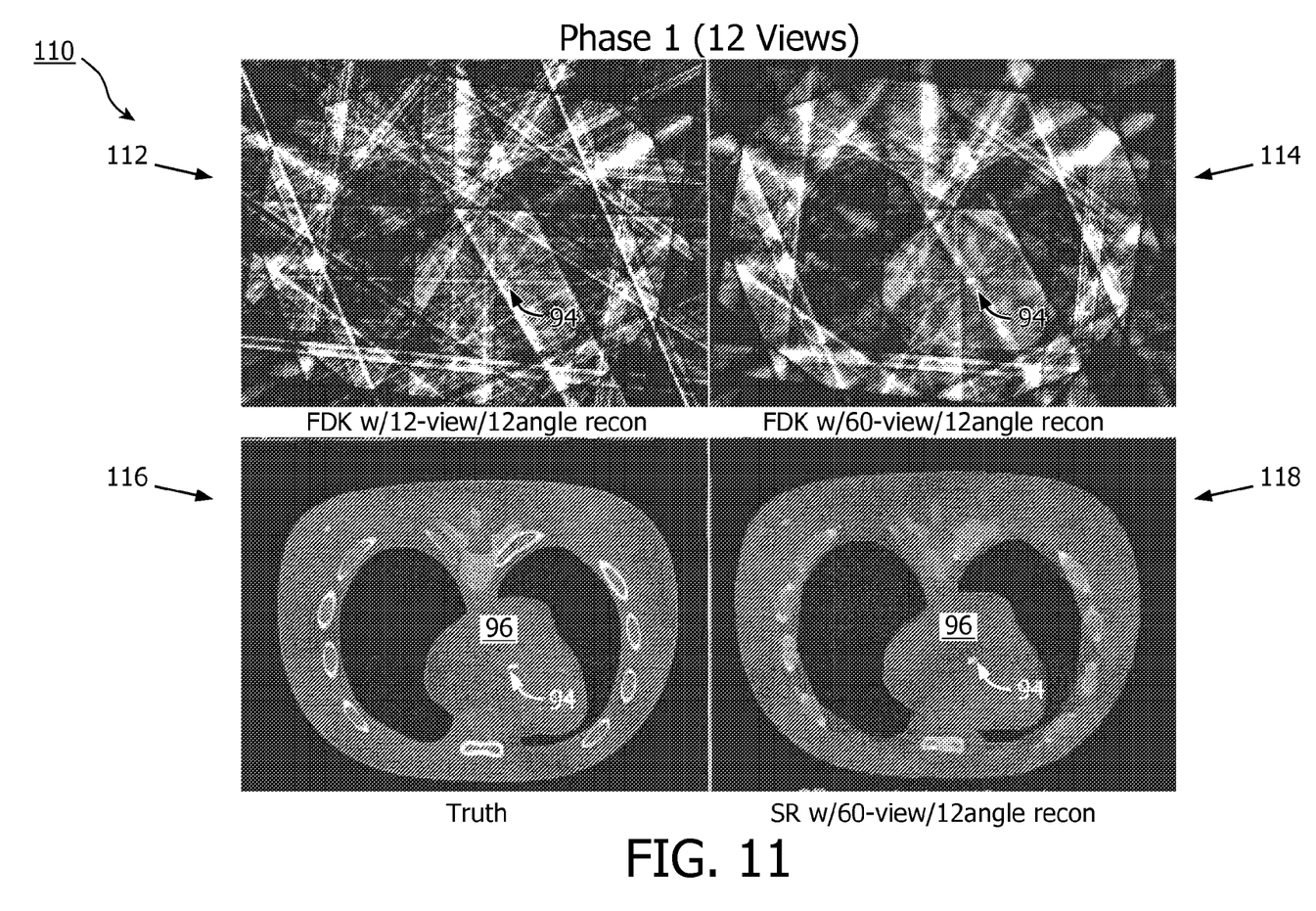
FIG. 11 illustrates an example screenshot of a first phase of a 12-heart cycle scan, shown with a calcium deposit.

FIG. 11 illustrates an example screenshot 110 of a first phase of a 12-heart cycle scan, shown with a calcium deposit. Image 112 is a first projection image generated using Feldkamp-Davis-Kress (FDK) reconstruction of acquired scan data taken during a first phase of the heart cycle at 12 different angles around the heart 96, with the calcium deposit 94 shown as a bright spot. The projection image data has been acquired from 12 sampling angles, or arcs, which are projections of a first phase of several heartbeats, or cycles. The sampling angles from which data has been acquired are approximately 30° apart from each other, to cover a complete 360° rotation around the patient. The acquired projection data is then back-projected, and the intensities are summed.

Image 114 is another first stage image generated using FDK reconstruction of acquired scan data taken during a first phase of the heart cycle at 60 different angles around the heart 96, with the calcium deposit 94 shown as a bright spot. In one embodiment, the 60 sampling angles are divided into 12 groups, each including 5 projections that are 0.75° apart. Each sampling group is approximately 30° apart from the next sampling group and covers a first phase of a different heartbeat. For instance, a first sampling group includes 5 samples of a first phase of a first heartbeat; a second sampling group includes 5 samples of the first phase of a second heartbeat, and so on. The data for the image 114 is a more complete than the data for the image 112, since it contains 5 projections per sampling group rather than 1.

Image 116 shows a phantom truth image of the heart 96 with the calcium deposit. Image 118 shows a sparsely reconstructed image of the patient's heart 96 with the calcium deposit 94, generated from data collected along 60 sampling angles in 12 different 5-sample groups spaced approximately 30° apart along a 360° rotation around the patient. It will be appreciated that the described embodiments are not limited to 12 arcs of 5 angles with the particular spacing and lengths described herein, but rather any desired number of arcs and/or angles, with any desired length and/or spacing may be employed.

Figure 12:
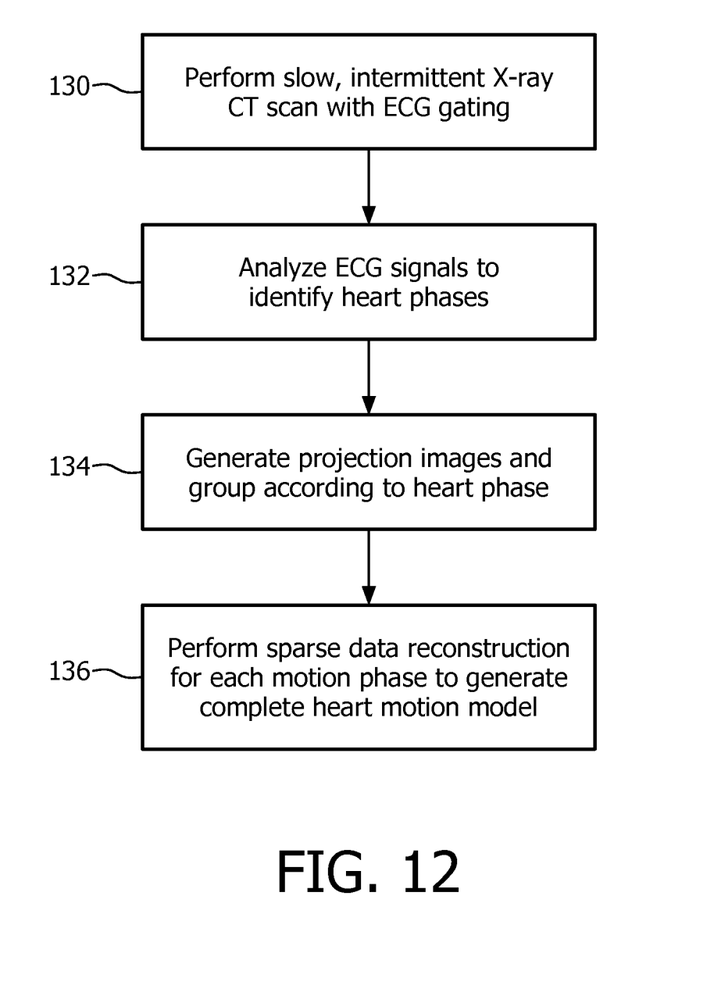
FIG. 12 illustrates a method of using a sparse data reconstruction technique to image a periodically moving object (e.g. a heart).

FIG. 12 illustrates a method of using a sparse data reconstruction technique to image a periodically moving object (e.g. a heart). At 130, a slow (e.g., less than approximately 6 rpm) X-ray scan of the beating heart is performed with ECG gating. The scan duration is long enough to include several heart cycles, but short enough to for breath-holding during the scan. At 132, the ECG signals are analyzed to identify different phases of the heart cycles. At 134, based on the ECG signals, projection images are generated and grouped according to their different heart phases. Each imaged phase contains several projections from a given phase of each heart beat. At 136, a sparse data reconstruction technique or algorithm is executed on the acquired data to reconstruct each motion phase and compose an image of a complete heart motion cycle.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

The invention claimed is:

1. A system that facilitates using sparse data reconstruction for gated computed tomography imaging, including:
   a CT scanner that includes a rotating gantry with an X-ray source and a flat panel X-ray detector, and that performs a slow CT scan of a heart in a patient in order to generate a plurality of sets of projection image data while rotating the gantry continuously around the patient, wherein the CT scanner collects sparse projection data over a plurality of short arc segments corresponding to phases of multiple physiological cycles during a 360° revolution around the patient;
   a patient monitoring device that generates physiological cycle phase information; and
   a processor that:
   sorts the projection image data by a plurality of physiological cycle phases such that the data for each physiological cycle phase spans a plurality of short arc segments separated by long arc segments during which data is not collected, the long arc segments being longer than the short arc segments;
   executes a sparse data reconstruction algorithm and reconstructs an image of each of the physiological cycle phases, each image being reconstructed over the plurality of short arc segments corresponding to the physiological cycle phase during a plurality of physiological cycles.

2. The system according to claim 1, wherein the gantry rotates at a speed of 6 rpm or less during the CT scan.

3. The system according to claim 1, wherein the CT scanner acquires scan data for approximately 8-12 physiological cycles in a revolution, each physiological cycle including the plurality of physiological cycle phases.

4. The system according to claim 1, wherein the physiological cycle is one of a heart cycle and a respiratory cycle, and the patient monitor device is one of an electrocardiograph (ECG) and a respiratory monitor, respectively.

5. The system according to claim 4, wherein the processor gates acquired scan data for each phase of the heart cycle using ECG signal data in order to correspond acquired scan data to each heart cycle phase.

6. The system according to claim 4, further including a computer-readable medium that stores one or more of:
   a data acquisition algorithm;
   acquired projection data;
   ECG signal data;
   ECG data timestamp information;
   ECG gating algorithm;
   a sparse reconstruction algorithm;
   heart images; and
   heart motion phase data.

7. The system according to claim 1, wherein the CT scanner is a multi-modal CT scanner comprising the x-ray source, the flat-panel x-ray detector, and two nuclear detectors.

8. The system according to claim 1, further comprising a display on which the images are displayed to a user for calcium scoring.

9. The system according to claim 1, further including an attenuation correction module that is executed by the processor to correct attenuation in a nuclear image using the image.

10. A method of using sparse data reconstruction for gated X-ray computed tomography imaging, including:
    acquiring CT scan data of a beating heart by slowly and continuously rotating a gantry of a CT scanner, with an X-ray source and a flat-panel x-ray detector coupled thereto, about a patient to generate a plurality of sets of projection image data, wherein sparse projection data is collected over a plurality of short arc segments corresponding to phases of multiple physiological cycles during a 360° revolution around the patient;
    acquiring physiological signal data describing a plurality of physiological cycles of the patient's heart while acquiring the CT scan data;
    identifying different phases of each physiological cycle using the physiological signal data;
    sorting the projection image data according to a phase during which the image projection data was acquired; and
    executing a sparse reconstruction algorithm on the sorted projection image data to reconstruct images of each identified phase of the physiological cycles.

11. The method according to claim 10, further including:
    rotating the gantry at a speed of 6 rpm or less during the CT scan.

12. The method according to claim 10, further including:
    acquiring scan data for approximately 8-12 physiological cycles in a revolution, each physiological cycle including a plurality of physiological cycle phases.

13. The method according to claim 10, wherein the physiological cycle is one of a heart cycle and a respiratory cycle, and the patient monitor device is one of an electrocardiograph (ECG) and a respiratory monitor, respectively.

14. The method according to claim 13, further including:
    gating acquired scan data for each phase of the heart cycles using ECG signal data; and
    correlating the acquired scan data to the heart cycle phase during which the scan data was acquired.

15. The method according to claim 13, wherein the CT scanner is a multi-modal CT scanner comprising the X-ray source, the flat-panel X-ray detector, and two nuclear detectors.

16. The method according to claim 10, further comprising rotating the CT gantry 360° over a period of approximately 12 seconds when acquiring the scan data.

17. The method according to claim 13, further including:
  correcting for attenuation in a nuclear image of the heart using the reconstructed images of each identified phase of the heart cycles.

18. A processor or non-transitory computer-readable medium configured to perform the method according claim 10.

* * * * *